United States Patent
Amanuma et al.

(10) Patent No.: US 6,988,779 B2
(45) Date of Patent: Jan. 24, 2006

(54) HYBRID VEHICLE

(75) Inventors: Hirokatsu Amanuma, Saitama (JP); Tetsu Sugiyama, Saitama (JP); Shuji Oshida, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 116 days.

(21) Appl. No.: 10/702,031

(22) Filed: Nov. 6, 2003

(65) Prior Publication Data

US 2004/0238244 A1  Dec. 2, 2004

(30) Foreign Application Priority Data

Nov. 12, 2002 (JP) .............................. 2002-328182

(51) Int. Cl.
*B60T 8/66* (2006.01)
(52) U.S. Cl. ...................... 303/152; 303/186; 180/65.2
(58) Field of Classification Search ................ 303/152, 303/186, 187, 188, 189, 20, 3; 188/156, 188/158, 159, 181 T, 349; 701/70, 22, 108; 180/165, 65.1, 65.2, 65.3, 65.4, 65.5, 65.6, 180/65.7, 65.8; 318/371
See application file for complete search history.

(56) References Cited

U.S. PATENT DOCUMENTS

| 6,099,089 | A * | 8/2000 | Schneider ................... 303/152 |
| 6,122,587 | A * | 9/2000 | Takahara et al. .............. 701/78 |
| 6,275,763 | B1 * | 8/2001 | Lotito et al. ................... 701/71 |
| 6,295,487 | B1 * | 9/2001 | Ono et al. ..................... 701/22 |
| 6,406,105 | B1 * | 6/2002 | Shimada et al. ............. 303/152 |
| 6,453,228 | B1 * | 9/2002 | Shimada ....................... 701/89 |
| 6,454,364 | B1 * | 9/2002 | Niwa et al. .................. 303/152 |
| 6,508,523 | B2 * | 1/2003 | Yoshino ..................... 303/152 |
| 6,549,840 | B1 * | 4/2003 | Mikami et al. ................ 701/69 |
| 6,588,860 | B2 * | 7/2003 | Kosik et al. ................. 303/152 |
| 6,598,945 | B2 * | 7/2003 | Shimada et al. ............. 303/152 |
| 6,719,076 | B1 * | 4/2004 | Tabata et al. .............. 180/65.7 |
| 6,724,165 | B2 * | 4/2004 | Hughes ....................... 318/376 |
| 6,793,600 | B2 * | 9/2004 | Hiraiwa .......................... 475/5 |
| 6,811,229 | B2 * | 11/2004 | Soga ........................... 303/152 |
| 6,859,712 | B2 * | 2/2005 | Walenty et al. ................ 701/71 |
| 6,862,511 | B1 * | 3/2005 | Phillips et al. ................ 701/54 |
| 2002/0036429 | A1 * | 3/2002 | Shimada et al. ............. 303/152 |

FOREIGN PATENT DOCUMENTS

| JP | 2001-112114 | 4/2001 |
| JP | 2001-171378 A | 6/2001 |

* cited by examiner

*Primary Examiner*—J. Allen Shriver
(74) *Attorney, Agent, or Firm*—Arent Fox PLLC

(57) ABSTRACT

In a hybrid vehicle, an engine is connected to front wheels through a first motor/generator and a transmission, and a second motor/generator is connected to rear wheels. The first and second motors/generators are connected to a battery so that they are driven or regenerated. During regenerative braking of the vehicle, the distribution ratio of regenerative braking forces to the first and second motors/generators is controlled to become an ideal distribution ratio corresponding to a longitudinal acceleration (deceleration) of the vehicle, whereby the distribution ratio of the braking forces to the front and rear wheels can be always maintained at an optimal value during rapid deceleration as well as during slow deceleration of the vehicle, to improve the braking performance.

16 Claims, 12 Drawing Sheets

HYBRID VEHICLE

BACKGROUND OF THE INVENTION

1. Field of the Invention

The present invention relates to a hybrid vehicle in which an engine is connected to first driven wheels through a first motor/generator and a transmission, and a second motor/generator is connected to second driven wheels, the first and second motors/generators being connected to an accumulating means so that they are driven or regenerated.

2. Description of the Related Art

Such a hybrid vehicle is known from Japanese Patent Application Laid-open No. 2001-112114. In this hybrid vehicle, even when the operation of any of the first motor/generator and the second motor/generator is limited, the correlation between the heat ratings of the first and second motors/generators is set in a particular state (specifically, a state in which the heat rating of the first motor/generator is higher than the heat rating of the second motor/generator) in order to appropriately control the distribution ratio of the driving forces or the regenerative braking forces to the front and rear wheels to ensure a travel stability.

In a hybrid vehicle including first and second motors/generators at front and rear wheels respectively, when both the first and second motors/generators at front and rear wheels are braked for regeneration during deceleration of the vehicle to recover an electric energy, if the distribution ratio of the braking forces to the first and second motors/generators is inappropriate, the behavior of the vehicle may become unstable, so that an appropriate braking effect may not be obtained in some cases. Moreover, the appropriate distribution ratio of the braking forces to the first and second motors/generators changes depending on the operational state of the vehicle, and hence it is insufficient to merely set the distribution ratio of the braking forces to be uniform.

SUMMARY OF THE INVENTION

Accordingly, it is an object of the present invention to ensure that the distribution ratio of the regenerative braking forces to the first and second motors/generators connected to the first and second driven wheels of a hybrid vehicle is set appropriately to provide a high braking performance.

To achieve the above object, according to a first feature of the present invention, there is provided a hybrid vehicle in which an engine is connected to first driven wheels through a first motor/generator and a transmission, and a second motor/generator is connected to second driven wheels, said first and second motors/generators being connected to an accumulating means so that they are driven or regenerated, wherein distribution ratio of braking forces to the first and second motors/generators is controlled to become an ideal distribution ratio corresponding to a longitudinal acceleration of the vehicle during regenerative braking of the vehicle.

With such arrangement, in the hybrid vehicle including the first and second motors/generators connected to the first and second driven wheels respectively, the distribution ratio of a braking force to the first and second motors/generators is controlled to become the ideal distribution ratio corresponding to the longitudinal acceleration of the vehicle during regenerative braking of the vehicle. Therefore, the distribution ratio of the braking forces to the first and second driven wheels can be always maintained at an optimal value during rapid deceleration as well as during slow deceleration of the vehicle, to improve the braking performance.

According to a second feature of the present invention, in addition to the arrangement of the first feature, the first and second driven wheels are front and rear wheels, respectively, and when the vehicle is traveling down a slope, the distribution ratio of the regenerative braking force to the second motor/generator is decreased to be smaller than the ideal distribution ratio.

With such arrangement, when the vehicle is traveling down the slope, the distribution ratio of the regenerative braking force to the second motor/generator connected to the rear wheels is decreased. Therefore, it is possible to decrease the distribution ratio of the regenerative braking force to the rear wheels whose grounding load is decreased when the vehicle is traveling down the slope, thereby preventing the occurrence of the locking of the wheels.

According to a third feature of the present invention, in addition to the arrangement of the second feature, when the vehicle is traveling down the slope, a degree of inclination of a road surface is calculated based on a vehicle speed and a longitudinal acceleration of the vehicle.

With the above arrangement, the degree of inclination of the road surface is calculated based on the vehicle speed and the longitudinal acceleration of the vehicle, and hence even during traveling of the vehicle, the degree of inclination of the road surface can be calculated accurately.

According to a fourth feature of the present invention, in addition to the arrangement of the first feature, the first and second driven wheels are front and rear wheels, respectively, and when a lateral acceleration of the vehicle exceeds a predetermined value and a vehicle speed exceeds a predetermined value, the distribution ratio of the regenerative braking force to the second motor/generator is decreased to be smaller than the ideal distribution ratio.

With the above arrangement, when the lateral acceleration of the vehicle exceeds a predetermined value and the vehicle speed exceeds a predetermined value, the distribution ratio of the regenerative braking force to the second motor/generator connected to the rear wheels is decreased. Therefore, it is possible to decrease the distribution ratio of the regenerative braking force to the rear wheels to ensure a stable braking performance during turning of the vehicle at a high speed.

According to a fifth feature of the present invention, in addition to the arrangement of the fourth feature, the lateral acceleration of the vehicle is calculated based on the vehicle speed and a steering angle.

With the above arrangement, the lateral acceleration of the vehicle is calculated based on the vehicle speed and the steering angle, and hence it can be accurately calculated without need for a special lateral acceleration sensor.

According to a sixth feature of the present invention, in addition to the arrangement of the fourth or fifth feature, the decreasing control of the distribution ratio of the regenerative braking force to the second motor/generator is carried out in response to the start of the steering.

With the above arrangement, the decreasing control of the distribution ratio of the regenerative braking force to the second motor/generator is carried out in response to the start of the steering, and hence an unnecessary calculation is not be carried out during non-steering in which no lateral acceleration is generated.

According to a seventh feature of the present invention, in addition to the arrangement of the first feature, the first and second wheels are front and rear wheels, respectively, and when a yaw rate of the vehicle exceeds a predetermined value, the distribution ratio of the regenerative braking force to the second motor/generator is decreased to be smaller than the ideal distribution ratio.

With the above arrangement, when the yaw rate of the vehicle exceeds the predetermined value, the distribution ratio of the regenerative braking force to the second motor/generator connected to the rear wheels is decreased to be smaller than the ideal distribution ratio, and hence it is possible to decrease the distribution ratio of the regenerative braking force to the rear wheels to ensure a stable braking performance during turning of the vehicle.

According to an eighth feature of the present invention, in addition to the arrangement of the first feature, during operation of a mechanical brake, a braking force for the second driven wheels determined depending on the ideal distribution ratio is generated by the second motor/generator and the mechanical brake, and a deficiency of the regenerative braking force for the second motor/generator limited by the remaining capacity of the accumulating means is made up by a braking force of the mechanical brake.

With the above arrangement, when the braking force for the second driven wheels determined depending on the ideal distribution ratio is generated by the second motor/generator and the mechanical brake, the deficiency of the regenerative braking force for the second motor/generator limited by the remaining capacity of the accumulating means is made up by the braking force of the mechanical brake. Therefore, it is possible to generate a braking force corresponding to the ideal distribution ratio in the second driven wheels, while avoiding the excessive charging of the accumulating means.

According to a ninth feature of the present invention, in addition to the arrangement of the eighth feature, when the braking force of the mechanical brake exceeds a predetermined value, a threshold value for the remaining capacity of the accumulating means permitting the regenerative braking of the second motor/generator is increased.

With the above arrangement, when the braking force of the mechanical brake exceeds a predetermined value, the threshold value for the remaining capacity of the accumulating means permitting the regenerative braking of the second motor/generator is increased. Therefore, the maximum regenerative braking can be caused in the second motor/generator in case of emergency requiring a large braking force.

According to a tenth feature of the present invention, in addition to the first feature, the engine is constructed so that the rotational resistance can be decreased by the stopping of cylinders, and when the engine is brought into a cylinder-stopped state to regeneratively brake the vehicle, if the remaining capacity of the accumulating means exceeds a predetermined value, the cylinder-stopped state of the engine is canceled, and the first motor/generator is driven by an electric power generated by the second motor/generator so that an increment in rotational resistance of the engine due to the cancellation of the cylinder-stopped state is countervailed.

With the above arrangement, when the vehicle is braked regeneratively in a state in which the rotational resistance of the engine has been decreased by the stoppage of cylinders, if the remaining capacity of the accumulating means exceeds the predetermined value, the cylinder-stopped state of the engine is canceled, and the first motor/generator is driven by the electric power generated by the second motor/generator so that the increment in rotational resistance of the engine due to the cancellation of the cylinder-stopped state is countervailed. Therefore, it is possible not only to prevent the accumulating means from being excessively charged by causing the first motor/generator to consume the electric power generated by the second motor/generator, but also to alleviate a shock generated with the increase in the rotational resistance of the engine upon the cancellation of the cylinder-stopped state by a driving force of the first motor/generator.

According to an eleventh feature of the present invention, in addition to the arrangement of the first feature, the first and second driven wheels are front and rear wheels, respectively, and the distribution ratio of the regenerative braking force to the second motor/generator is increased in accordance with a decrease in a road surface friction coefficient.

With the above arrangement, the distribution ratio of the regenerative braking force to the second motor/generator connected to the rear wheels is increased in accordance with the decrease in a road surface friction coefficient. Therefore, when the road surface friction coefficient is low, the distribution ratio of the regenerative braking force to the rear wheels can be increased to ensure a stable braking performance.

According to a twelfth feature of the present invention, in addition to the arrangement of the first feature, the regenerative braking of the first and second motors/generators is prohibited during an ABS control.

With the above arrangement, the regenerative braking of the first and second motors/generators is prohibited during the ABS control. Therefore, it is possible to prevent the ABS control from interfering with the regenerative braking, to reliably prevent the locking of the wheels.

A battery B in each of embodiments corresponds to the accumulating means of the present invention, and front wheels Wf and rear wheels Wr in each of the embodiments correspond to first driven wheels and second driven wheels, respectively, of the present invention.

The above and other objects, features and advantages of the invention will become apparent from the following description of the preferred embodiment taken in conjunction with the accompanying drawings.

DESCRIPTION OF THE PREFERRED EMBODIMENTS

The present invention will now be described by way of a preferred embodiment with reference to the accompanying drawings.

Figure 1:
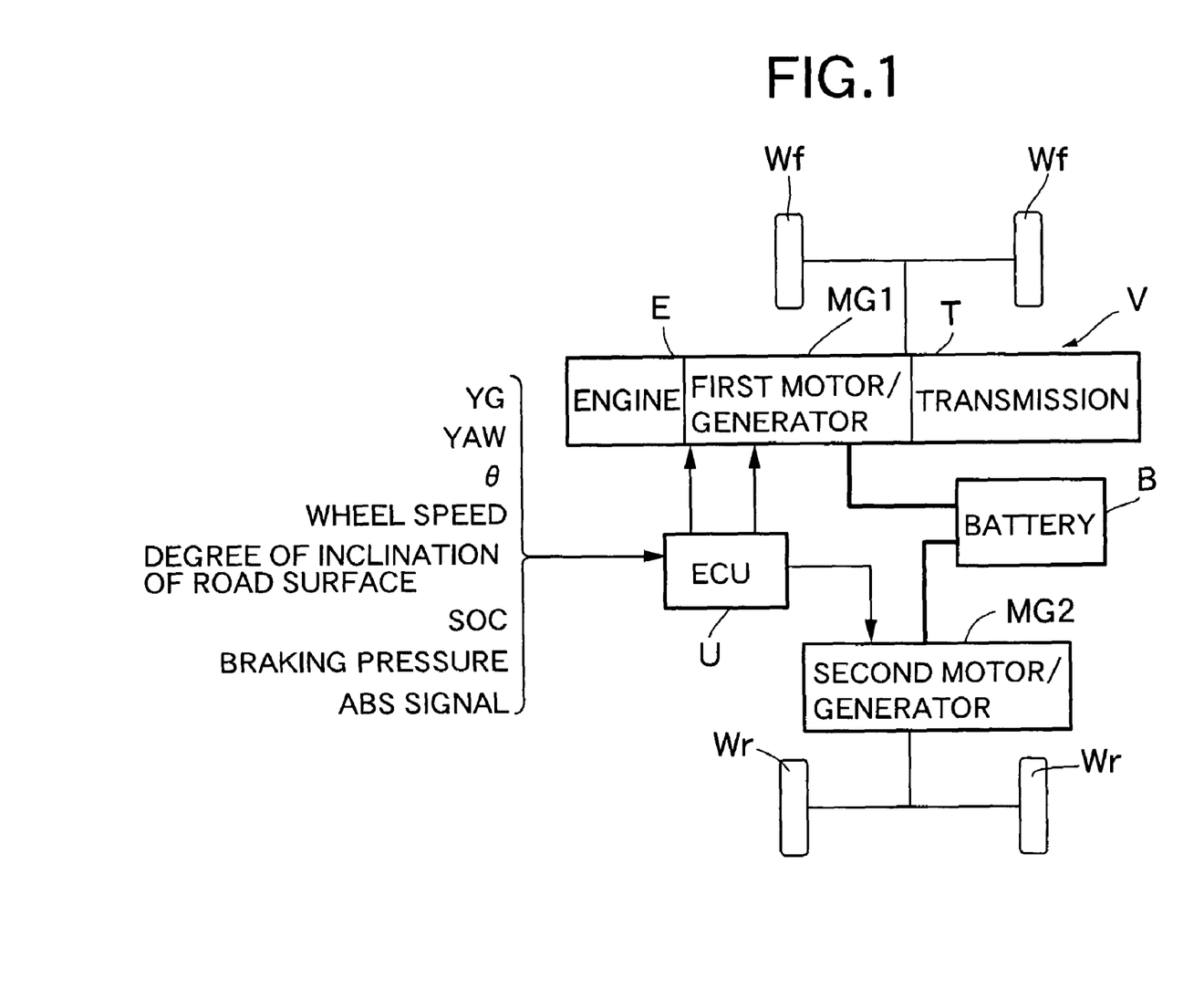
FIG. 1 is a diagram of the entire arrangement of a power-transmitting system of a hybrid vehicle.

Referring first to FIG. 1, in a hybrid vehicle V, an engine E, all cylinders of which can be stopped, is connected through a first motor/generator MG1 and a transmission T to front wheels Wf, Wf which are first driven wheels. A second motor/generator MG2 is connected to rear wheels Wr, Wr which are second driven wheels. A battery B as an accumulating means is connected to the first and second motor/generator MG1 and MG2. The operations of the engine E, the first motor/generator MG1 and the second motor/generator MG2 are controlled by an electronic control unit U which receives a lateral acceleration YG, a yaw rate YAW and a steering angle θ and wheel speeds of the vehicle, a degree of inclination of a road surface, SOC (a remaining capacity of the battery), a braking pressure and an ABS signal (an operating signal for an antilock brake system).

The lateral acceleration YG may be detected by a special sensor, but can be calculated according to $YG=Vv^2/R$, based on a turning radius R and a vehicle speed Vv determined corresponding to a steering angle θ, whereby the special sensor can be eliminated. If the degree of inclination of the road surface is detected based on a direction of the gravity with respect to a vehicle body, an error may be disadvantageously generated during acceleration and deceleration of the vehicle V. However, the generation of the error can be avoided by calculating the degree of inclination of the road surface based on a vehicle speed Vv and a longitudinal acceleration XG of the vehicle V resulting from the differentiation of the vehicle speed Vv.

When the cylinders of the engine are at stoppage, not only the supply of a fuel and the control of the ignition are stopped, but also the rotational resistance of the engine E is reduced to effectively conduct the generation of a power by the regenerative braking of the first motor/generator MG1, so that the control for decreasing the pumping loss by the closing of an intake valve is concurrently carried out.

Thus, during low-load traveling of the vehicle V, the engine E is stopped, and the front wheels Wf, Wf and/or the rear wheels Wr, Wr are driven by the first motor/generator MG1 and/or the second motor/generator MG2 to cause the vehicle to travel. During high-load traveling of the vehicle V, the front wheels Wf, Wf are driven by the engine E to cause the vehicle V to travel, and if required, the first motor/generator MG1 and/or the second motor/generator MG2 is driven to assist the driving force of the engine E. During deceleration of the vehicle V, a kinetic energy of the vehicle V is recovered as an electric energy to charge the battery B by causing the first motor/generator MG1 and/or the second motor/generator MG2 to function as a generator.

Figure 2:
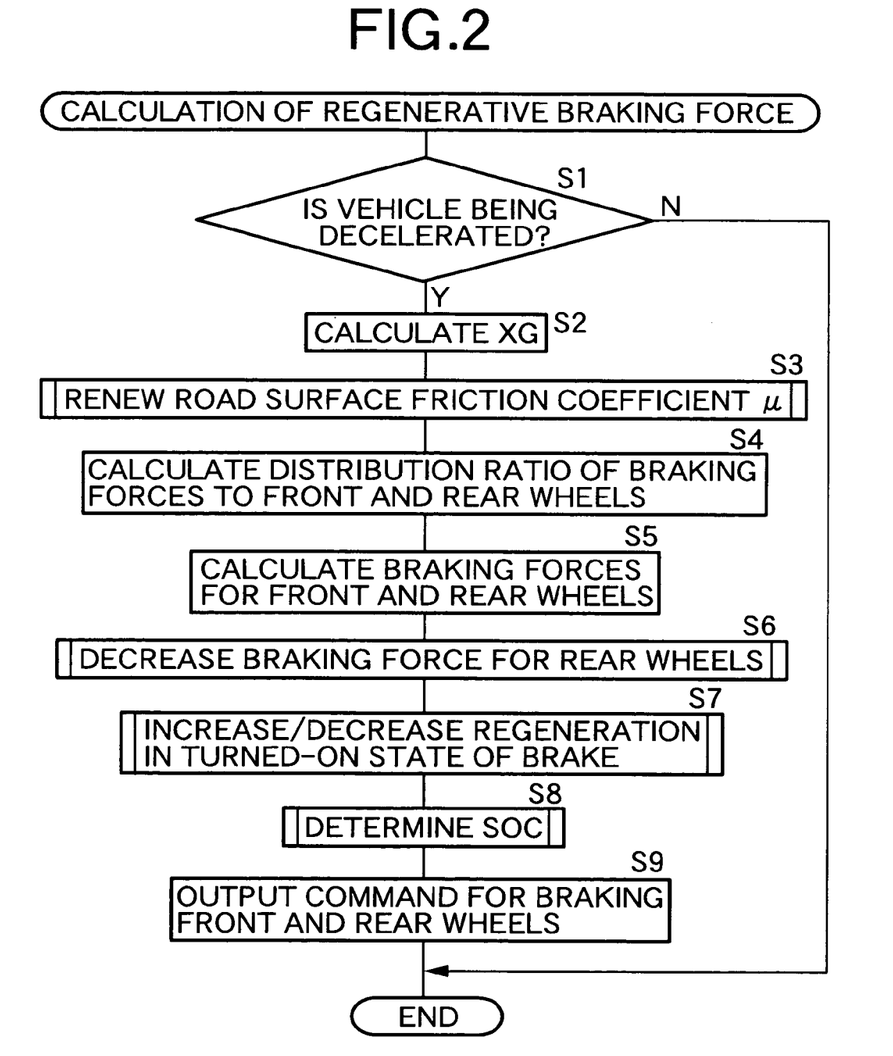
FIG. 2 is a flow chart of a routine for calculating regenerative braking forces for front and rear wheels.

A flow chart of a routine for calculating regenerative braking forces for the front wheels Wf, Wf and the rear wheels Wr, Wr will be described below with reference to FIG. 2.

First, if a vehicle speed Vv calculated from wheel speeds is a negative value and the vehicle V is being decelerated at Step S1, a longitudinal acceleration XG of the vehicle V is calculated by differentiating the vehicle speed Vv at Step S2. A road surface friction coefficient is renewed at subsequent Step S3, and thereafter, a distribution ratio of regenerative braking forces to the front wheels Wf, Wf and the rear wheels Wr, Wr corresponding to the deceleration of the vehicle V is calculated at Step S4. For example, when the deceleration is 0.6 G in FIG. 9, the distribution ratio of the braking force to the rear wheels Wr, Wr is set at 36% which is an ideal distribution ratio; when the deceleration is 0.45 G, the distribution ratio is likewise set at 34%; and when the deceleration is 0.35 G, the distribution ratio is likewise set at 31%. At subsequent Step S5, regenerative braking forces for the front wheels Wf, Wf and the rear wheels Wr, Wr, namely, regenerative braking forces for the first motor/generator MG1 and the second motor/generator MG2 are calculated based on the distribution ratio of the braking forces.

Figure 9:
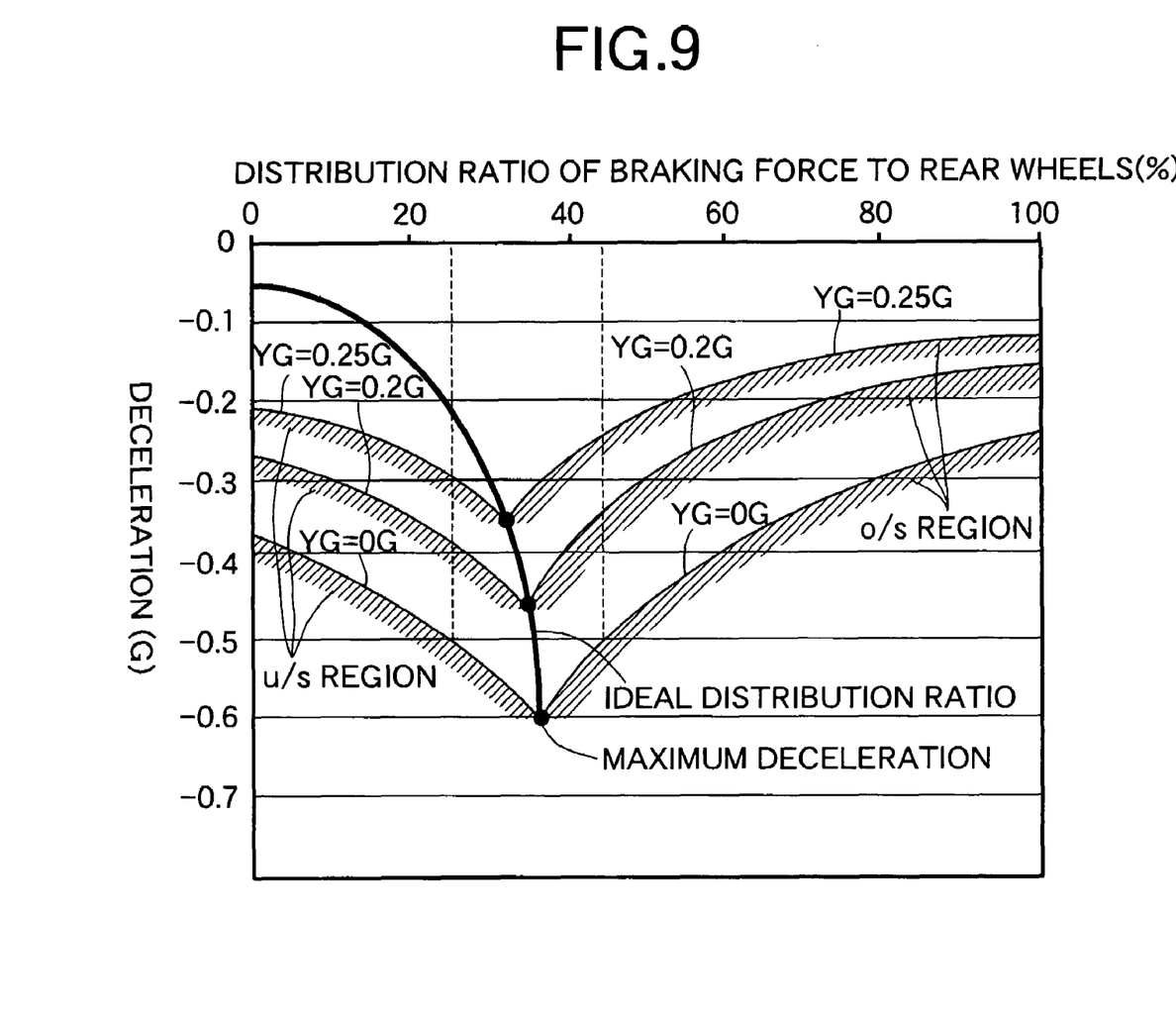
FIG. 9 is a graph showing the relationship among the distribution ratio of a braking force to the rear wheels and the deceleration as well as the lateral acceleration of the vehicle.

In a graph in FIG. 9, each of lines of the lateral acceleration YG equal to 0 G, 0.2 G and 0.25 G indicates a limit line, in a region below which the steering characteristic of the vehicle V is an over-steering or an under-steering. Even if the distribution ratio of the braking forces to the front wheels Wf, Wf and the rear wheels Wr, Wr is out of the ideal distribution ratio, if it is above the limit line, the occurrence of the over-steering or the under-steering is inhibited. For example, when the lateral acceleration YG of the vehicle V is 0 G and the vehicle V is being decelerated at a deceleration of 0.5 G, if the distribution ratio of the braking force to the rear wheels Wr, Wr is equal to or lower than 25%, the under-steering occurs, and when the distribution ratio of the braking force to the rear wheels Wr, Wr is equal to or higher than 44%, the over-steering occurs.

The control of the distribution ratio of the braking force to the rear wheels Wr, Wr based on a road surface friction coefficient will be described below with reference to FIGS. 10 and 11.

Figure 10:
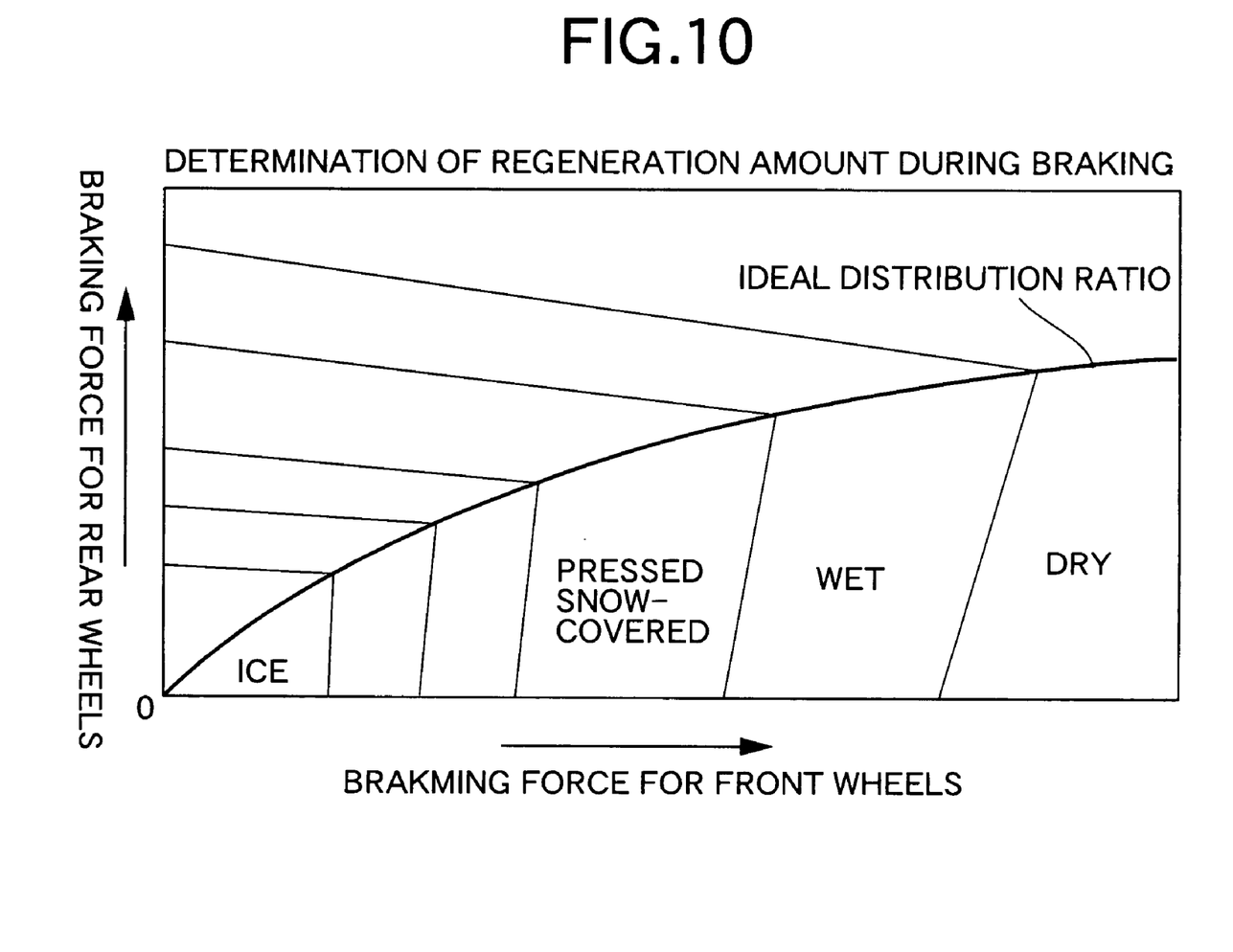
FIG. 10 is a graph showing an ideal distribution ratio of braking forces to the front and rear wheels in accordance with a road surface friction coefficient.

FIG. 10 shows a change in ideal distribution ratio of the braking forces to the front wheels Wf, Wf and the rear wheels Wr, Wr depending on the road surface friction coefficient, when the front wheels Wf, Wf are braked by the regenerative braking force of the first motor/generator MG1 and the rear wheels Wr, Wr are braked by the regenerative braking force of the second motor/generator MG2. On an ordinary dry road having a large road surface friction coefficient, the distribution ratio of the braking force to the rear wheels Wr, Wr is set at a small value. However, as the road surface friction coefficient is decreased, namely, the ideal distribution ratio of the braking force to the rear wheels Wr, Wr is gradually increased with a change of the state of a road surface, such as a dry road→a wet road→a pressed-snow covered road→an iced road, the ideal distribution ratio of the braking forces to the rear wheels Wr, Wr is gradually increased. Of course, both the magnitudes of the braking forces for the front wheels Wf, Wf and the rear wheels Wr, Wr are decreased with a decrease in road surface friction coefficient so that the wheels are not locked.

Figure 11:
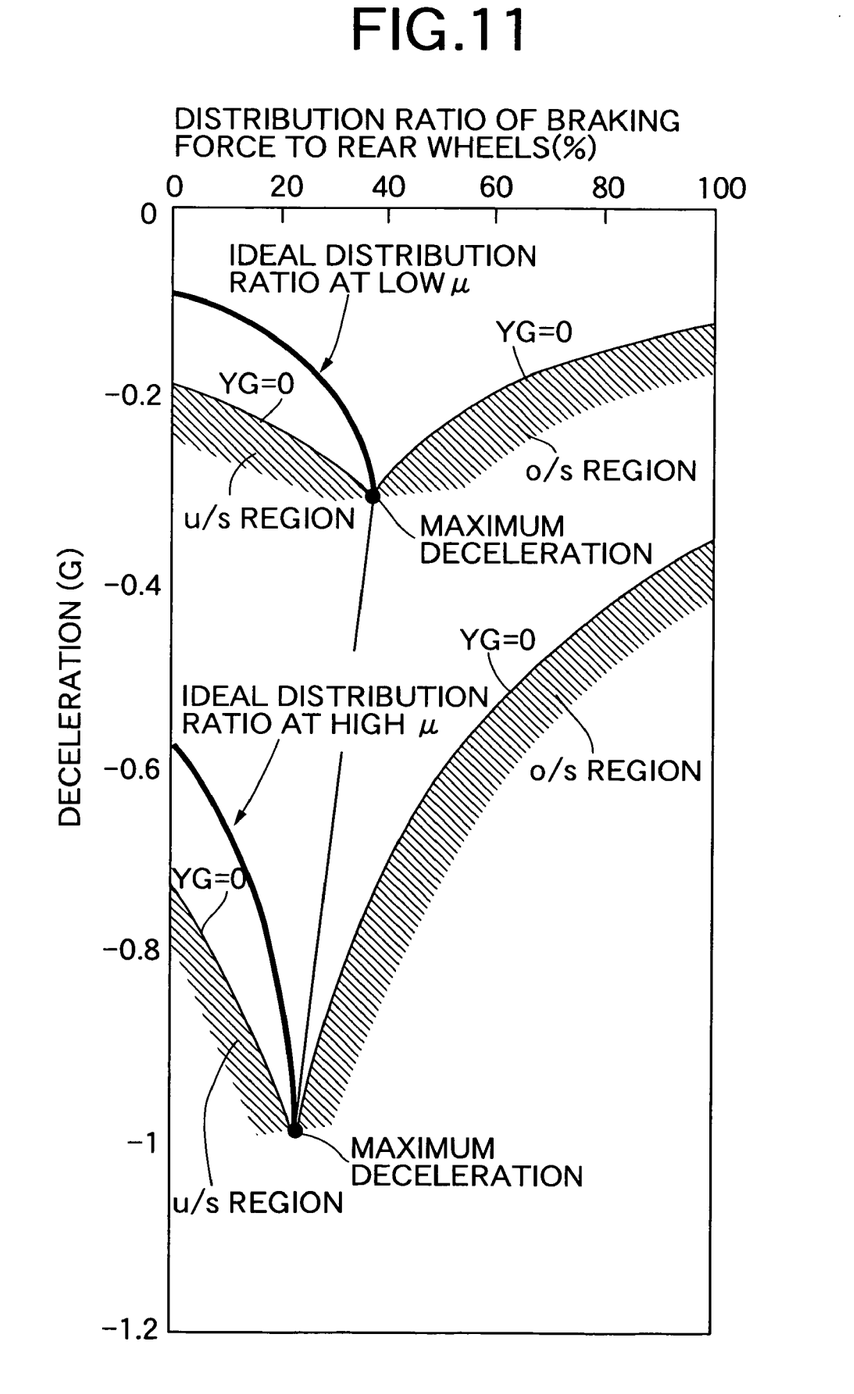
FIG. 11 is a graph showing the relationship between the distribution ratio of the braking force to the rear wheels and the deceleration of the vehicle as well as the road surface friction coefficient.

As apparent from FIG. 11, on a road surface having a high road surface friction coefficient, not only the maximum deceleration which can be generated is large (−1 G), but also the distribution rate (22%) of the braking force to the rear wheels Wr, Wr, at which the maximum deceleration is provided, is low. On the other hand, on a road surface having a low road surface friction coefficient, not only the maximum deceleration which can be generated is small (−0.3 G), but also the distribution ratio (37%) of the braking force to the rear wheels Wr, Wr, at which the maximum deceleration is provided, is high.

Thus, even if the state of the road surface variously changes, an appropriate braking performance can be always ensured by increasing the distribution ratio of the braking force to the second motor/generator MG2 connected to the rear wheels Wr, Wr with a decrease in road surface friction coefficient, as described above.

When a predetermined condition is established at subsequent Step S6, the regenerative braking force for the rear wheels Wr, Wr is decreased and the regenerative braking force the front wheels Wf, Wf is increased, while the total regenerative braking force for the front wheels Wf, Wf and the rear wheels Wr, Wr is maintained. At subsequent Step S7, the distribution ratio of the braking forces for a regenerative braking and a mechanical braking (a hydraulic braking) is increased or decreased depending on the magnitude of SOC, while the total braking force for the rear wheels Wr, Wr is substantially maintained. Then, an SOC determining processing for preventing the battery B from being excessively charged during regenerative braking of the rear wheels Wr, Wr is carried out at Step S8. Finally, a command for regenerative braking of the front wheels Wf, Wf and the rear wheels Wr, Wr is output at Step S9.

Figure 3:
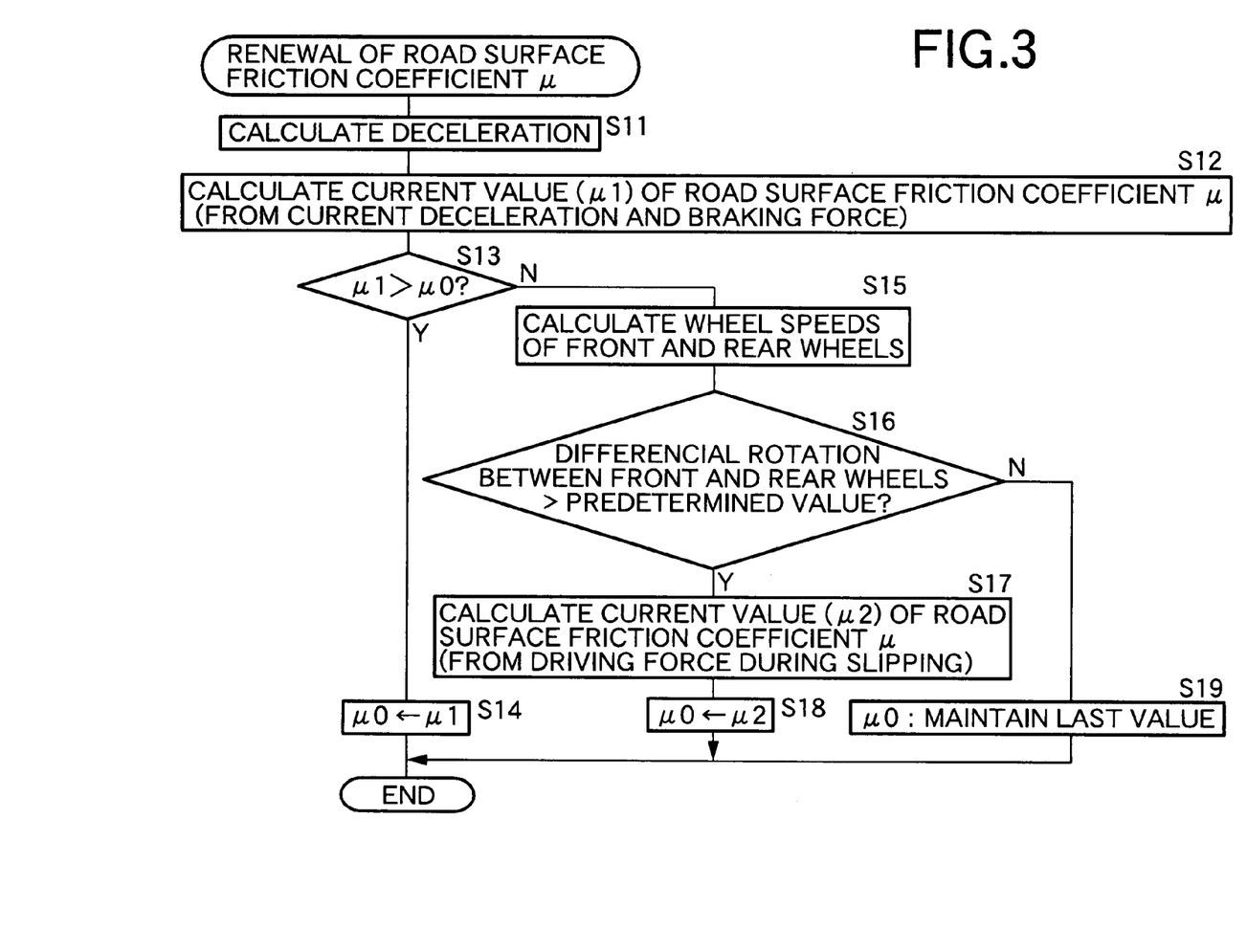
FIG. 3 is a flow chart of a routine for renewing a road surface friction coefficient.

A subroutine of the Step S3 will be described below with reference to a flow chart in FIG. 3.

First, a current deceleration of the vehicle V is calculated at Step S1. The deceleration of the vehicle V corresponds to a longitudinal acceleration XG of the vehicle V. However, because the longitudinal acceleration XG changes depending on a degree of inclination of a road surface, the longitudinal acceleration XG is corrected by a degree of inclination of a road surface to calculate a deceleration of the vehicle V on a flat road surface. At subsequent Step S12, a current value $\mu 1$ of a road surface friction coefficient is calculated from the current deceleration of the vehicle V and a braking force. If the current value $\mu 1$ of the road surface friction coefficient is larger than a last value $\mu 0$ at Step S13, the last value $\mu 0$ of the road surface friction coefficient is replaced by the current value $\mu 1$ at Step S14.

On the other hand, if the current value $\mu 1$ of the road surface friction coefficient is equal to or smaller than the last value $\mu 0$ at Step S13, wheel speeds of the front wheels Wf, Wf and the rear wheels Wr, Wr are calculated at Step S15. However, because the wheel speeds differentiate between inner wheels and outer wheels during turning of the vehicle V, wheel speeds during straight traveling of the vehicle, which is corrected in accordance with a steering angle θ, is calculated. If a differential rotation between the front wheels Wf, Wf and the rear wheels Wr, Wr exceeds a predetermined value at Step S16, i.e., if the rate of slip of the wheels is large, a current value $\mu 2$ of the road surface friction coefficient is calculated based on a driving force during slipping at Step S17, and the last value $\mu 0$ of the road surface friction coefficient is replaced by the current value $\mu 2$ at Step S18. On the other hand, if the differential rotation between the front wheels Wf, Wf and the rear wheels Wr, Wr is equal to or smaller than the predetermined value at Step S16, i.e., if the rate of slip of the wheels is small, the last value $\mu 0$ of the road surface friction coefficient is maintained as the current value at Step S19.

Figure 4:
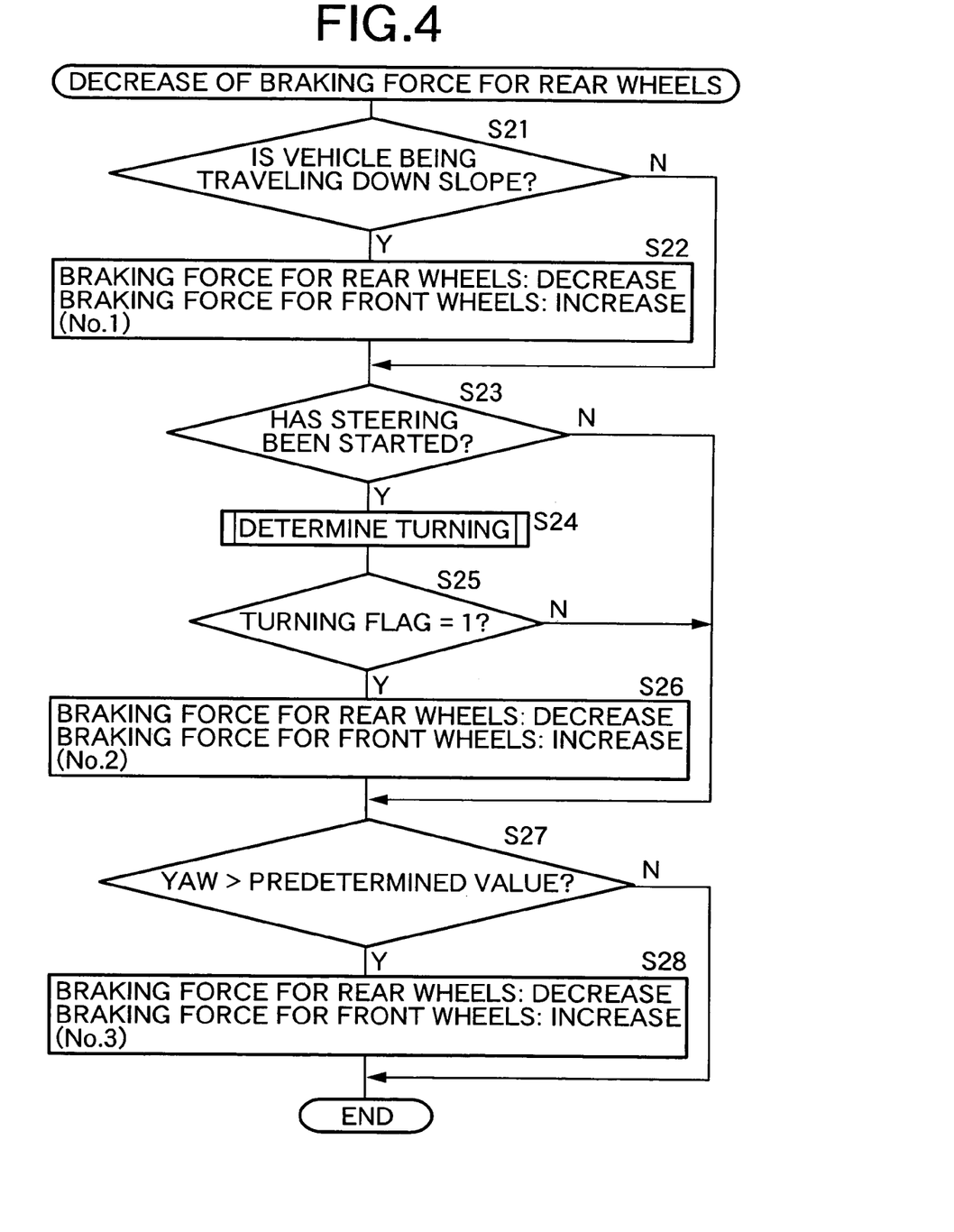
FIG. 4 is a flow chart of a routine for decreasing a braking force for rear wheels.

A subroutine of Step S6 will be described below with reference to a flow chart in FIG. 4.

First, if it is determined, based on a degree of inclination of a road surface at Step S21, that the vehicle V is traveling down a slope, a processing (No.1) is performed at Step S22 as follows: decreasing the regenerative braking force for the rear wheels Wr, Wr; and correspondingly increasing the regenerative braking force for the front wheels Wf, Wf. When the vehicle V is traveling down the slope, the weight of the vehicle body applied to the front wheels Wf, Wf is increased, and the weight of the vehicle body applied to the rear wheels Wr, Wr is decreased. Therefore, the locking of the rear wheels Wr, Wr can be prevented by decreasing the distribution of the braking force to the rear wheels Wr, Wr.

Figure 5:
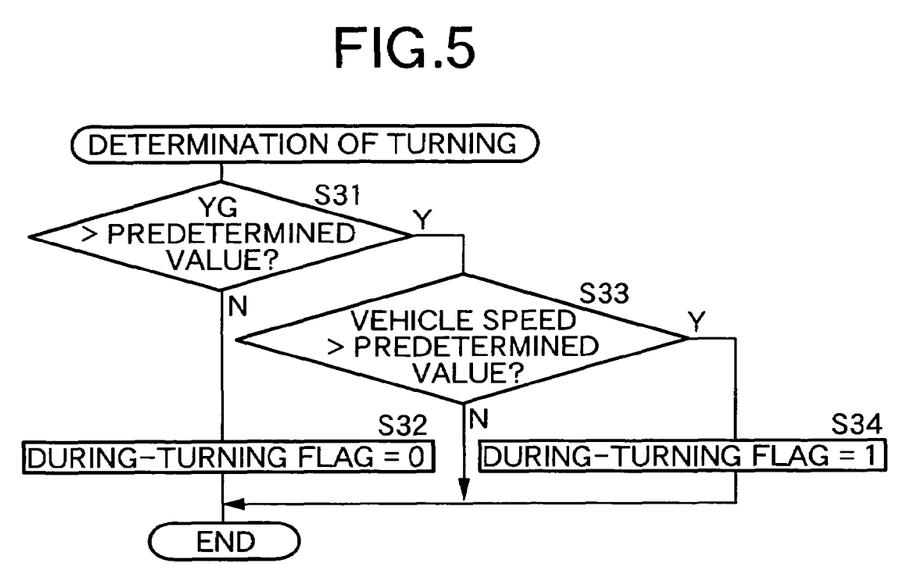
FIG. 5 is a flow chart of a turning-determining routine.

When it is determined, based on the steering angle θ at subsequent Step S23, that the steering has been started, it is determined at Step S24 whether the vehicle is in a predetermined turning state. A subroutine of Step S24 will now be described with reference to a flow chart in FIG. 5. First, if the lateral acceleration YG is equal to or smaller than a predetermined value at Step S31, a during-turning flag is reset at "0" (namely, not during turning) at Step S32. If the lateral acceleration YG exceeds the predetermined value at Step S31 and the vehicle speed Vv exceeds a predetermined value at Step S33, the during-turning flag is set at "1" (namely, during turning).

Returning to the flow chart in FIG. 4, if a turning flag has been set at "1" at Step S25 to indicate that the vehicle is being turned, a processing (No.2) is performed at Step 26 as follows: decreasing the regenerative braking force for the rear wheels Wr, Wr; and correspondingly increasing the regenerative braking force for the front wheels Wf, Wf. Thus, the behavior of the vehicle V can be stabilized by increasing the distribution of the braking force to the front wheels Wf, Wf during turning of the vehicle V.

If a yaw rate YAW of the vehicle V exceeds a predetermined value at subsequent Step S27, it is determined as in this case that the vehicle V is being turned, and a processing (No.3) of decreasing the regenerative braking force for the rear wheels Wr, Wr and increasing the regenerative braking force for the front wheels Wf, Wf correspondingly is carried out at Step S28, as at Step S26, whereby the behavior of the vehicle V is stabilized during turning of the vehicle V.

A decreasing process using the lateral acceleration YG will be described as an example. When the lateral acceleration YG is increased such as 0G→0.2G→0.25G in FIG. 9, not only the maximum deceleration of the vehicle V is decreased such as 0.6G→0.45G→0.35G, but also the ideal distribution ratio of the braking force to the rear wheels Wr, Wr is decreased such as 36%→34%→31%.

A subroutine of Step S7 will be described below with reference to a flow chart in FIG. 6.

Figure 12:
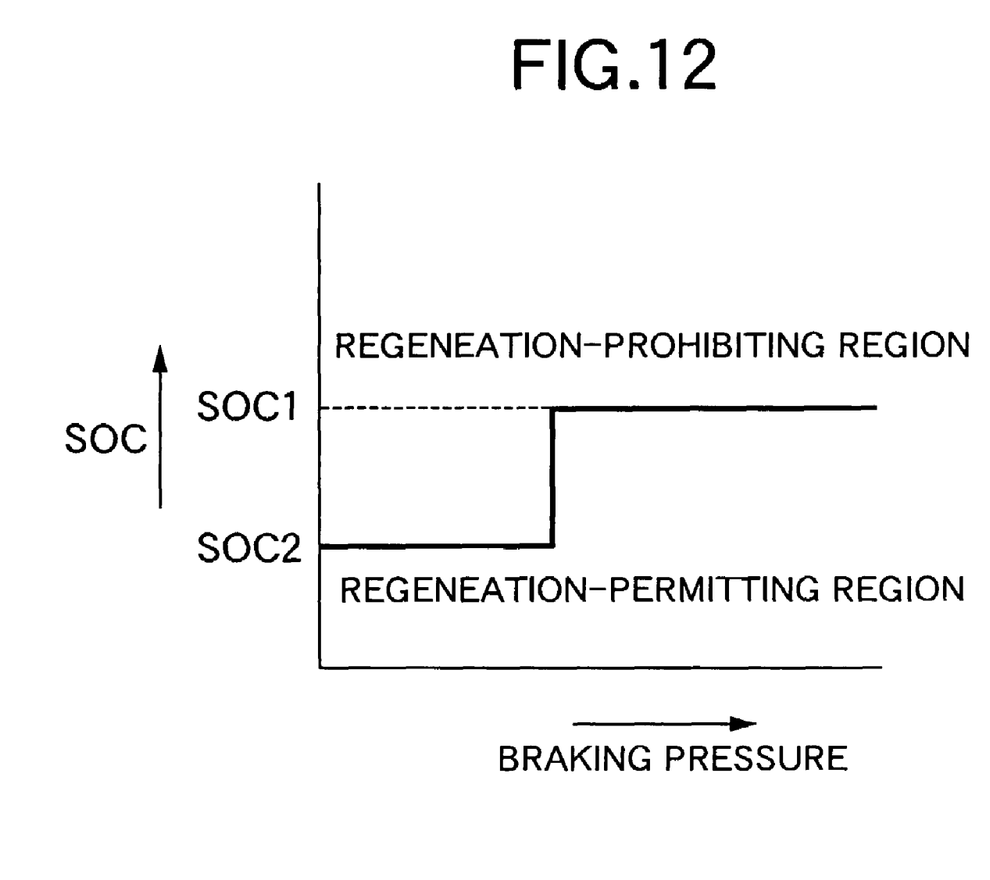
FIG. 12 is a graph showing the relationship between the braking pressure and SOC permitting the regenerative braking.

First, when a driver has depressed a brake pedal at Step S41, if the vehicle speed Vv exceeds a predetermined value at Step 42, a predetermined value of SOC (SOC permitting the regenerative braking) is calculated at Step S43. A subroutine of Step S43 will now be described with reference to a flow chart in FIG. 7. First, a braking pressure of the mechanical brake is detected at Step S51. If the braking pressure exceeds a predetermined value at Step S52, SOC1 shown in FIG. 12 is used as the predetermined value of SOC at Step S53. If the braking pressure is equal to or smaller than the predetermined value at Step S52, SOC2 shown in FIG. 10 is used as the predetermined value of SOC at Step S54.

In this way, when the braking pressure of the mechanical brake is large, namely, when a large braking force is required, the predetermined value of SOC permitting the regenerative braking of the second motor/generator MG2 is increased from SOC1 to SOC2 with the anticipation that the battery B will be excessively charged. Therefore, the regenerative braking of the second motor/generator MG2 can be carried out reliably in case of emergency to generate a large braking force.

Figure 6:
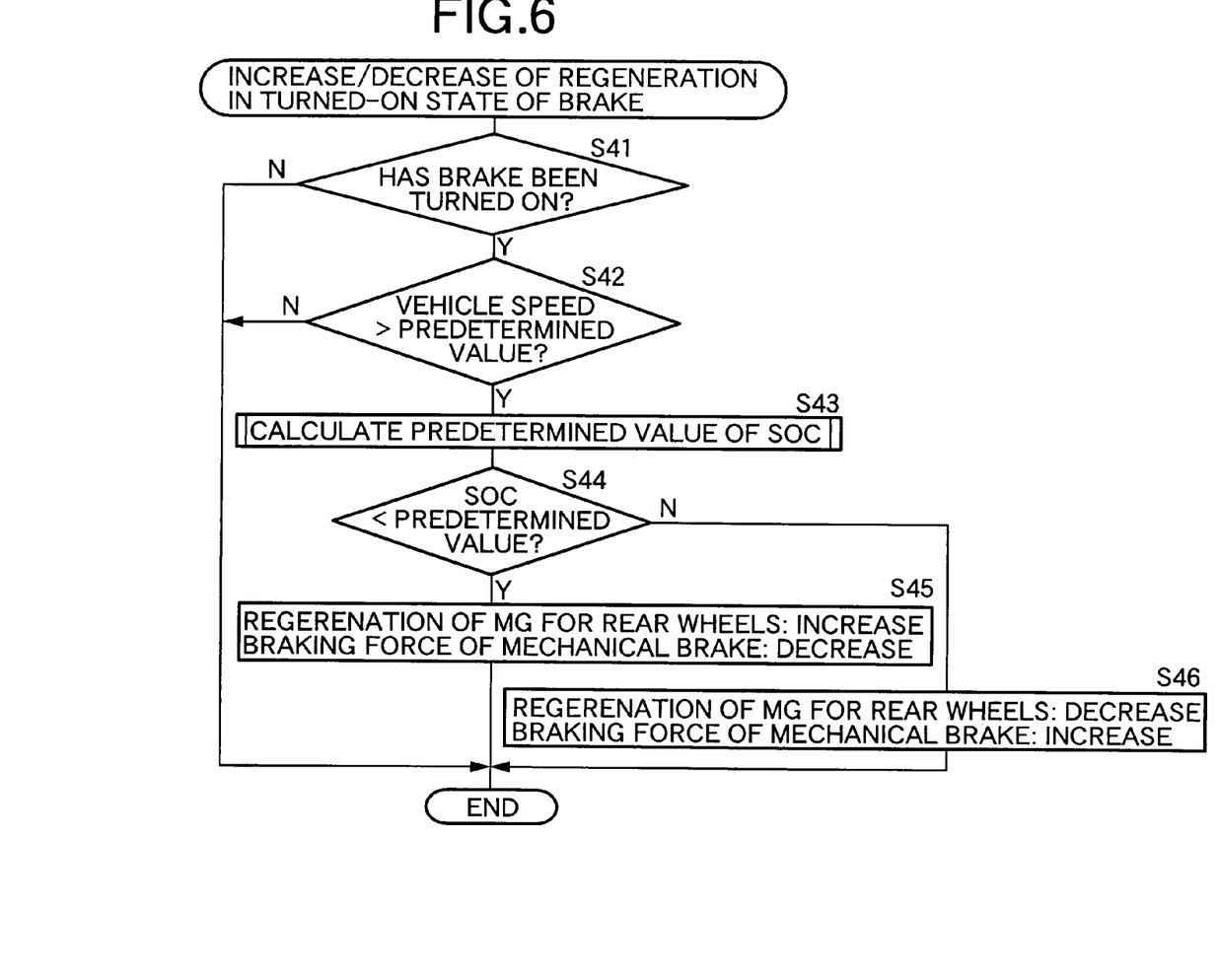
FIG. 6 is a flow chart of a routine for increasing and decreasing the regeneration in a turned-on state of a brake.
Figure 7:
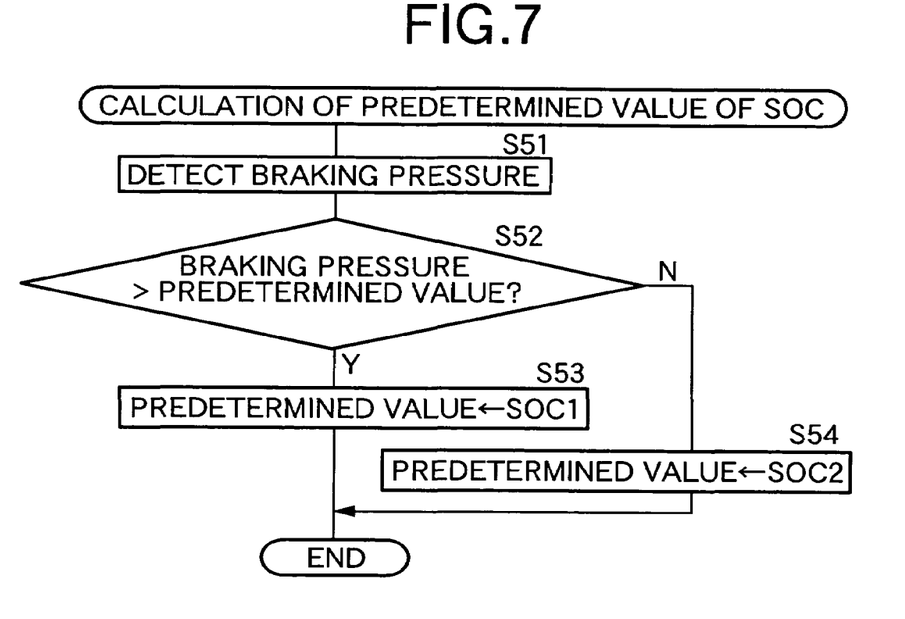
FIG. 7 is a flow chart of a routine for calculating a predetermined value of SOC.

Returning to the flow chart in FIG. 6, if the SOC is smaller than the predetermined value of SOC at Step S44, there is a margin to further charge the battery B. Therefore, the regenerative braking force of the second motor/generator MG2 for the rear wheels Wr, Wr is increased, and the braking force of the mechanical brake is correspondingly decreased at Step S45. On the other hand, if the SOC is equal to or larger than the predetermined value at Step S44, there is a possibility that the battery B would be excessively charged. Therefore, the regenerative braking force of the second motor/generator MG2 for the rear wheels Wr, Wr is decreased, and the braking force of the mechanical brake is increased correspondingly at Step S45. Thus, it is possible to maximize the efficiency of recovering the energy by the regenerative braking, while preventing the excessive charging of the battery B.

Figure 8:
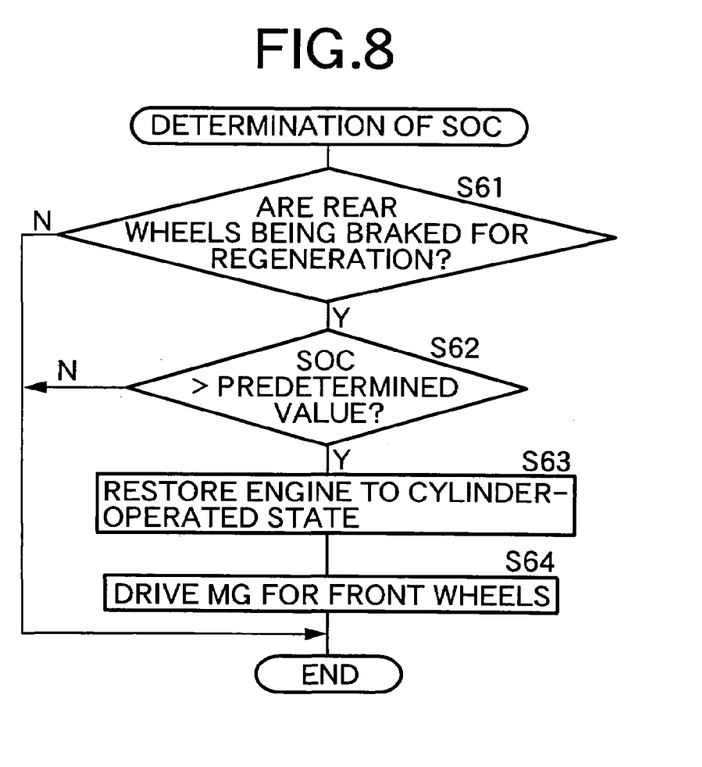
FIG. 8 is a flow chart of a routine for determining SOC.

A subroutine of Step S8 will be described below with reference to a flow chart in FIG. 8.

First, when the rear wheels Wr, Wr (the second motor/generator MG2) are being braked for regeneration at Step S61, if the SOC exceeds the predetermined value of SOC at Step S62, the engine E in a cylinders-stopped state is restored to an all cylinders-operated state at Step S63, and the first motor/generator MG1 is driven at Step S64.

Figure 13:
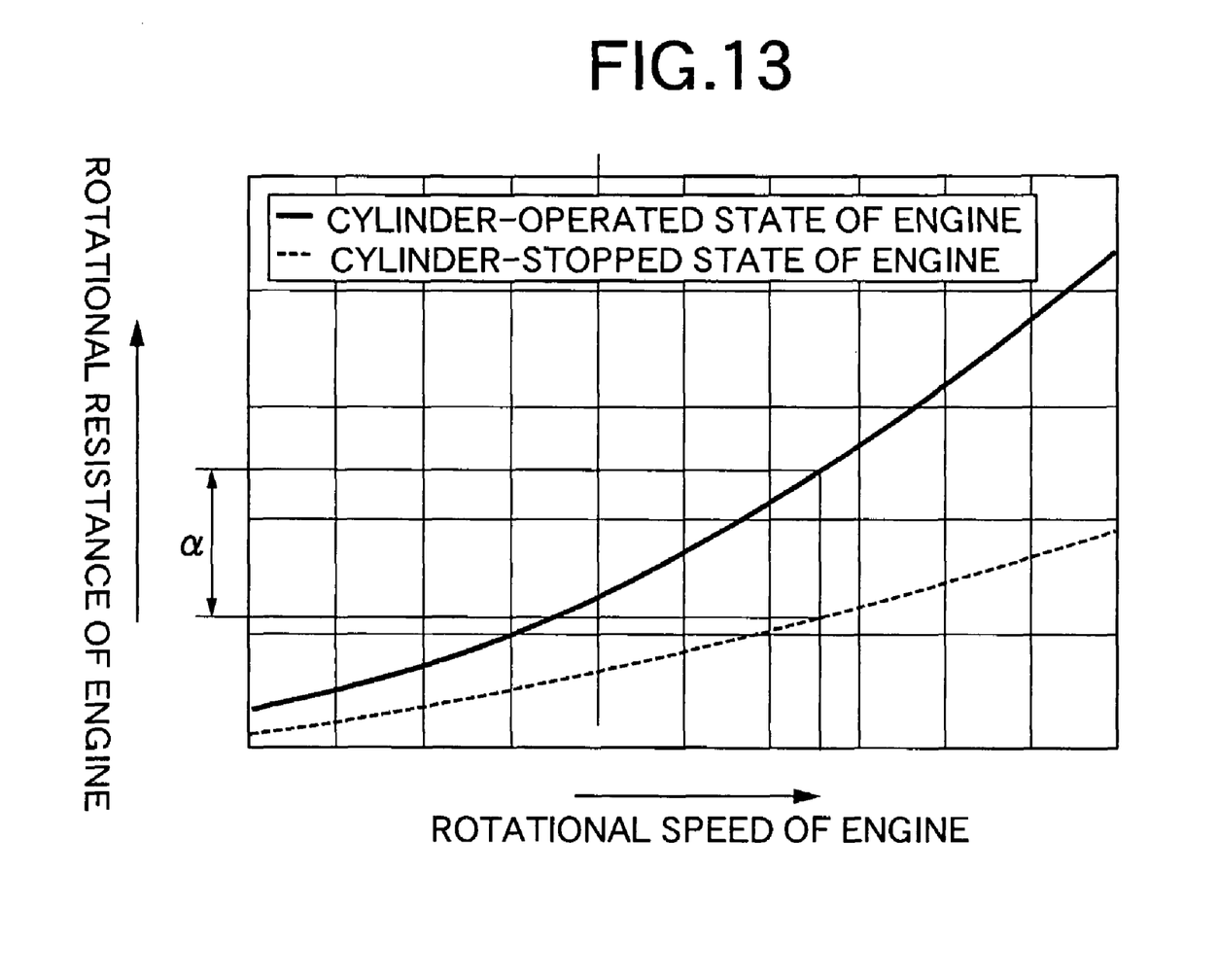
FIG. 13 is a graph showing rotational loads of an engine during operation of the engine in an all cylinders-operated state and in a cylinders-stopped state.

As apparent from FIG. 13, the rotational resistance (namely, an engine brake force) of the engine E during operation of all the cylinders is smaller by α than the rotational resistance during stoppage of the cylinders with the pumping loss decreased by the closing control of the intake valve. Therefore, when the engine E in the cylinders-stopped state is restored to the all cylinders-operated state at Step S63, a shock is generated due to an increase in rotational resistance corresponding to the pumping loss, but the increment in rotational resistance can be countervailed to prevent the generation of the shock by driving the first motor/generator MG1 at Step S64. Thus, it is possible to prevent the battery B from being excessively charged by consuming a regenerative electric power generated by the regenerative braking of the second motor/generator MG2 at Step S61 by driving the first motor/generator MG1.

As described above, when the vehicle V is decelerated by the regenerative braking of the first and second motors/generators MG1 and MG2, command values for the regenerative braking forces to the first and second motors/generators MG1 and MG2 are determined in order to achieve an ideal distribution ratio corresponding such deceleration. Therefore, the distribution ratio of the braking forces to the front wheels Wf, Wf and the rear wheels Wr, Wr can be appropriately controlled, to thereby reliably brake the vehicle V.

During turning of the vehicle at a high speed, the distribution ratio of the braking force to the rear wheels Wr, Wr is decreased depending on the turning state, so that the vehicle V can be braked reliably, while being maintained in a stable turning state.

During an ABS control for preventing the locking of the wheels by regulating the braking force of the mechanical brake, the regenerative braking of the first and second motors/generators MG1 and MG2 are prohibited, whereby the ABS control and the regenerative braking are prevented from interfering with each other.

Although the embodiment of the present invention has been described in detail, it will be understood that various modifications in design may be made without departing from the subject matter of the invention defined in the claims.

For example, the means for decreasing the pumping loss is not limited to that described in the embodiment, and a throttle valve may be fully opened to decrease the pumping loss.

The accumulating means is not limited to the battery B, and another accumulating means such as a capacitor may be used.

What is claimed is:

1. A hybrid vehicle in which an engine is connected to first driven wheels through a first motor/generator and a transmission, and a second motor/generator is connected to second driven wheels, said first and second motors/generators being connected to an accumulating means, wherein a distribution ratio of braking forces to the first and second motors/generators is controlled to become an ideal distribution ratio corresponding to a longitudinal acceleration of the vehicle during regenerative braking of the vehicle, wherein the first and second driven wheels are front and rear wheels, respectively, and when the vehicle is traveling down a slope, the distribution ratio of the regenerative braking force to the second motor/generator is decreased to be smaller than the ideal distribution ratio.

2. A hybrid vehicle according to claim 1, wherein, when the vehicle is traveling down the slope, a degree of inclination of a road surface is calculated based on a vehicle speed and a longitudinal acceleration of the vehicle.

3. A hybrid vehicle according to claim 1, wherein the regenerative braking of the first and second motors/generators is prohibited during an ABS control.

4. A hybrid vehicle in which an engine is connected to first driven wheels through a first motor/generator and a transmission, and a second motor/generator is connected to second driven wheels, said first and second motors/generators being connected to an accumulating means, wherein a distribution ratio of braking forces to the first and second motors/generators is controlled to become an ideal distribution ratio corresponding to a longitudinal acceleration of the vehicle during regenerative braking of the vehicle, wherein the first and second driven wheels are front and rear wheels, respectively, and when a lateral acceleration of the vehicle exceeds a predetermined value and a vehicle speed exceeds a predetermined value, the distribution ratio of the regenerative braking force to the second motor/generator is decreased to be smaller than said ideal distribution ratio.

5. A hybrid vehicle according to claim 4, wherein the lateral acceleration of the vehicle is calculated based on the vehicle speed and a steering angle.

6. A hybrid vehicle according to claim 4 or 5, wherein the decreasing control of the distribution ratio of the regenerative braking force to the second motor/generator (MG2) is carried out in response to the start of the steering.

7. A hybrid vehicle according to claim 4, wherein the regenerative braking of the first and second motors/generators is prohibited during an ABS control.

8. A hybrid vehicle in which an engine is connected to first driven wheels through a first motor/generator and a transmission, and a second motor/generator is connected to second driven wheels, said first and second motors/generators being connected to an accumulating means, wherein a distribution ratio of braking forces to the first and second motors/generators is controlled to become an ideal distribution ratio corresponding to a longitudinal acceleration of the vehicle during regenerative braking of the vehicle, wherein the first and second wheels are front and rear wheels, respectively, and when a yaw rate of the vehicle exceeds a predetermined value, the distribution ratio of the regenerative braking force to the second motor/generator is decreased to be smaller than said ideal distribution ratio.

9. A hybrid vehicle according to claim 8, wherein the regenerative braking of the first and second motors/generators is prohibited during an ABS control.

10. A hybrid vehicle in which an engine is connected to first driven wheels through a first motor/generator and a transmission, and a second motor/generator is connected to second driven wheels, said first and second motors/generators being connected to an accumulating means, wherein a distribution ratio of braking forces to the first and second motors/generators is controlled to become an ideal distribution ratio corresponding to a longitudinal acceleration of the vehicle during regenerative braking of the vehicle, wherein, during operation of a mechanical brake, a braking force for the second driven wheels determined depending on said ideal distribution ratio is generated by the second motor/generator and the mechanical brake, and a deficiency of the regenerative braking force for the second motor/generator limited by the remaining capacity of the accumulating means is made up by a braking force of the mechanical brake.

11. A hybrid vehicle according to claim 10, wherein, when the braking force of the mechanical brake exceeds a predetermined value, a threshold value for the remaining capacity of the accumulating means permitting the regenerative braking of the second motor/generator is increased.

12. A hybrid vehicle according to claim 10, wherein the regenerative braking of the first and second motors/generators is prohibited during an ABS control.

13. A hybrid vehicle in which an engine is connected to first driven wheels through a first motor/generator and a transmission, and a second motor/generator is connected to second driven wheels, said first and second motors/generators being connected to an accumulating means, wherein a distribution ratio of braking forces to the first and second motors/generators is controlled to become an ideal distribution ratio corresponding to a longitudinal acceleration of the vehicle during regenerative braking of the vehicle, wherein the engine is constructed so that the rotational resistance can be decreased by the stopping of cylinders, and when the engine is brought into a cylinder-stopped state to regeneratively brake the vehicle, if the remaining capacity of the accumulating means exceeds a predetermined value, the cylinder-stopped state of the engine is canceled, and the first motor/generator is driven by an electric power generated by the second motor/generator so that an increment in rotational resistance of the engine due to the cancellation of the cylinder-stopped state is countervailed.

14. A hybrid vehicle according to claim 13, wherein the regenerative braking of the first and second motors/generators is prohibited during an ABS control.

15. A hybrid vehicle in which an engine is connected to first driven wheels through a first motor/generator and a transmission, and a second motor/generator is connected to second driven wheels, said first and second motors/generators being connected to an accumulating means, wherein a distribution ratio of braking forces to the first and second motors/generators is controlled to become an ideal distribution ratio corresponding to a longitudinal acceleration of the vehicle during regenerative braking of the vehicle, wherein the first and second driven wheels are front and rear wheels, respectively, and the distribution ratio of the regenerative braking force to the second motor/generator is increased in accordance with a decrease in a road surface friction coefficient.

16. A hybrid vehicle according to claim 15, wherein the regenerative braking of the first and second motors/generators is prohibited during an ABS control.

* * * * *